United States Patent [19]

Hovey

[11] 4,289,497
[45] Sep. 15, 1981

[54] GRADIENT PHOTOCHROMIC LENS AND METHOD SELECTIVELY REDUCING PHOTOCHROMIC ACTIVITY

[75] Inventor: Richard J. Hovey, Sturbridge, Mass.

[73] Assignee: American Optical Corporation, Southbridge, Mass.

[21] Appl. No.: 183,654

[22] Filed: Sep. 2, 1980

[51] Int. Cl.$^3$ ................................................ D06P 5/00
[52] U.S. Cl. ................................................ 8/506; 8/519; 252/300; 350/353; 350/354; 350/438; 544/71
[58] Field of Search .................. 8/506, 519; 350/354, 350/353, 438; 252/300

[56] References Cited

U.S. PATENT DOCUMENTS

| | | | |
|---|---|---|---|
| 3,212,898 | 10/1965 | Cerreta | 430/345 |
| 3,562,171 | 2/1971 | Ono et al. | 544/71 |
| 3,578,602 | 5/1971 | Ono et al. | 544/101 |
| 3,666,352 | 5/1972 | Wagner et al. | 350/354 |
| 4,043,637 | 4/1977 | Hovey | 350/353 |
| 4,215,010 | 7/1980 | Hovey et al. | 430/345 |
| 4,245,991 | 1/1981 | Haddad et al. | 8/506 |

FOREIGN PATENT DOCUMENTS 3191 7/1979 European Pat. Off.
1418089 12/1975 United Kingdom.

*Primary Examiner*—A. Lionel Clingman
*Attorney, Agent, or Firm*—Alan H. Spencer

[57] ABSTRACT

A new gradient photochromic lens having a uniform resistance to fatigue is disclosed. A method for selectively reducing photochromic activity in one or more portions of a lens having a photochromic dye uniformly disposed across the surface thereof is also disclosed.

14 Claims, No Drawings

GRADIENT PHOTOCHROMIC LENS AND METHOD SELECTIVELY REDUCING PHOTOCHROMIC ACTIVITY

BACKGROUND OF THE INVENTION

The present invention relates to photochromic lenses and more particularly to gradient photochromic lenses. The present invention also relates to a method of preparing gradient photochromic lenses or inhibiting photochromic activity in a lens having a photochromic dye therein.

Synthetic plastic photochromic lenses are well known in the art. Such lenses include a plastic host and a photochromic dye either disposed in the host material during the shaping or by imbibing from a solution subsequent to lens shaping. Glass lenses having gradient photochromic properties are also well known in the art. Such lenses are generally prepared by mixing a latent photochromic material with the glass composition during the lens manufacturing process and then selectively activating portions of the lens to provide gradient photochromic activity. Although the lens contains a uniform concentration of latent material, the concentration of material converted from the latent condition to a state capable of acting in response to radiation, such as ultraviolet light, varies across the lens surface.

Dyeing, or tinting as it is frequently referred to, of plastic lenses for aesthetic and sunscreening purposes is well known to those skilled in the art. Such dying processes include those using other photochromic or non-photochromic dyes. Conventionally, the dyes are either uniformly dispersed throughout the lens, when a uniform lens character is desired, or dispersed in the lens providing portions having different concentrations in order to provide special effects such as gradient lenses. It is also known to apply one dye uniformly to a lens and a second dye in a non-uniform manner in order to vary the color characteristics of the lens in different portions thereof. Photochromic dyes in combination with non photochromic are also known.

The propensity of photochromic materials to fatigue, i.e. cease to shift between the inactive and active states, after prolonged exposure to activating radiation is well known. It is also known that lenses fatigue in two different conditions. The first condition is where fatigue produces a permanently activated material. This condition occurs in glass compositions containing silver halides. The second condition is where the fatigue produces a permanently inactive material. The latter condition is known to occur with certain organic dyes. Photochromic lenses having the property of fatiguing in the second condition are preferred. Since potentially active photochromic particles previously screened from activating radiation by other photochromic particles converted to the active state may begin to function photochromically, the life of the article is extended beyond that which it would normally have if fatigue occurred in the first condition.

U.S. Pat. No. 3,666,352 issued May 30, 1972 and discloses that the photochromic activity of mercury thiocarbazones may be prolonged (fatigue resistance) by using a uniform U.V. absorber without affecting the photochromic activity.

U.S. Pat. No. 3,212,898 issued Oct. 19, 1965 and discloses U.V. absorbers to prevent fatigue of photochromic articles by shielding the photochromic material from an extraneous amount of U.V. light.

BRIEF DESCRIPTION OF THE INVENTION

Plastic optical elements having photochromic dyes can be made gradient photochromic or have all photochromic activity inhibited by treating the element with a material that inhibits photochromic activity when absorbed in the element. Dyes which fatigue in the inactive state are preferred since they provide a prolonged element life.

U.S. Pat. No. 4,215,010 issued July 29, 1980 discloses a class of dyes which fatigue in the second condition and are particularly useful in practicing the present invention with ophthalmic lenses. For dyes of this type, conventional U.V. absorbers are useful. Such absorbers can be inbibed from organic solutions using conventional lens dyeing techniques. This class of dyes is hereinafter referred to as SO dyes.

DESCRIPTION OF THE PREFERRED EMBODIMENT

A number of cast polyallyldiglycolcarbonate lenses were immersed for eight hours in a 3.5 weight percent solution of 1,3,3,5,6-pentamethyl-9'-methoxy spiroindolinenaphthooxine, an SO dye, in propylene diglycol at 122° C. After drying, the lenses exhibited a uniform photochromic activity.

Several dyed lenses were then treated by gradual immersion in a 10 weight percent solution of 2,2'dihydroxy-4-methoxy benzophone in propylene glycolate at 120° C. over a three minute period and then withdrawn from the solution. The gradual immersion provided a higher concentration of U.V. absorber in the portions with the longest duration in the solution with practically no U.V. absorber in the opposite portions. The dyed and treated lenses exhibited a gradual decrease in photochromic activity across their surface when activated with actinic radiation of 300 to 400 nm wavelength.

A dyed and treated lens and a dyed untreated lens were fully immersed for 15 minutes in the hot solution of U.V. absorber. Both lenses did not exhibit photochromic activity following this inhibiting treatment.

The photochromic materials may be incorporated within optically clear plastics such as poly(allyl diglycol carbonate), polyacrylates, polymethacrylates, cellulose acetate, cellulose triacetate, cellulose acetate propionate, cellulose acetate butyrate, poly(vinylacetate), poly(vinylalcohol), polyester resins, and preferably poly(allyl diglycol carbonate), polycarbonate, poly(methylmethacrylate), and cellulose acetate butyrate or propionate to make a photochromic element suitable for a photochromic sunglass lens, ski goggle or the like. Frequently, the photochromic material is incorporated in one layer of a laminate, usually an intermediate layer. The inhibiting material can be incorporated into the same or a different layer or surface than the photochromic material. Those skilled in the art can select compatible inhibiting materials and solvents useful in practicing the present invention with the various plastic hosts.

I claim:
1. An optical element exhibiting gradient photochromic response comprising:
   a synthetic plastic host,
   a photochromic spiroindolinenaphthooxine dye, said dye being dispersed uniformly across at least one element surface, an ultra-violet radiation absorbing material, said material being capable of inhibiting activation of said photochromic dye and said material dispersed in greater concentrations in selected portions of the element whereby photochromic activity of the dyed lens varies with the concentration of said material.

2. The optical element of claim 1 wherein said element is a lens.

3. The lens of claim 2 wherein said host is selected from the group consisting of polycarbonate, poly allyl diglycol carbonate, celulose acetate, cellulose propionate, cellulose butyrate and cellulose acetate butyrate.

4. The lens of claim 3 wherein the host is polycarbonate.

5. The lens of claim 3 wherein the host is poly allyl diglycol carbonate.

6. The lens of claim 3 wherein the host is cellulose acetate.

7. The lens of claim 3 wherein the host is cellulose acetate butyrate.

8. The lens of claim 6 wherein the host is one layer of a laminated lens.

9. The lens of claim 3 or 4 wherein the host includes a dyable, abrasion-resistant coating.

10. The element of claim 1 wherein the concentration of said material in at least one portion is zero.

11. A gradient photochromic plastic lens having a uniform fatigue resistance which comprises:
a synthetic plastic host,
a photochromic spiroindolinenaphthooxine dye, said dye being dispersed uniformly across at least one lens surface,
an ultra-violet radiation absorbing material, said material being capable of inhibiting activation of said photochromic dye and said material dispersed in greater concentrations in selected portions of the lens whereby photochromic activity of the dyed lens is not uniform.

12. A method of reducing the photochromic activity of a plastic lens containing a photochromic spiroindolinenaphthooxine dye dispersed uniformly across at least one surface, which comprises imbibing an ultra-violet light inhibiting material capable of blocking radiation which activates the dye.

13. The method of claim 12 wherein differing concentrations of material are provided by immersing different portions of the lens in a UV absorber containing solution for different periods of time.

14. The method of claim 12 wherein photochromic activity is reduced below a visually perceptable level by imbibing a sufficient quantity of material to inhibit perceptable photochromic activity in substantially all portions of the lens.

* * * * *